Feb. 20, 1934.  R. S. STAFFORD ET AL  1,948,434
AUTOMOBILE TIRE CHANGING MACHINE
Filed Nov. 30, 1932   2 Sheets-Sheet 1
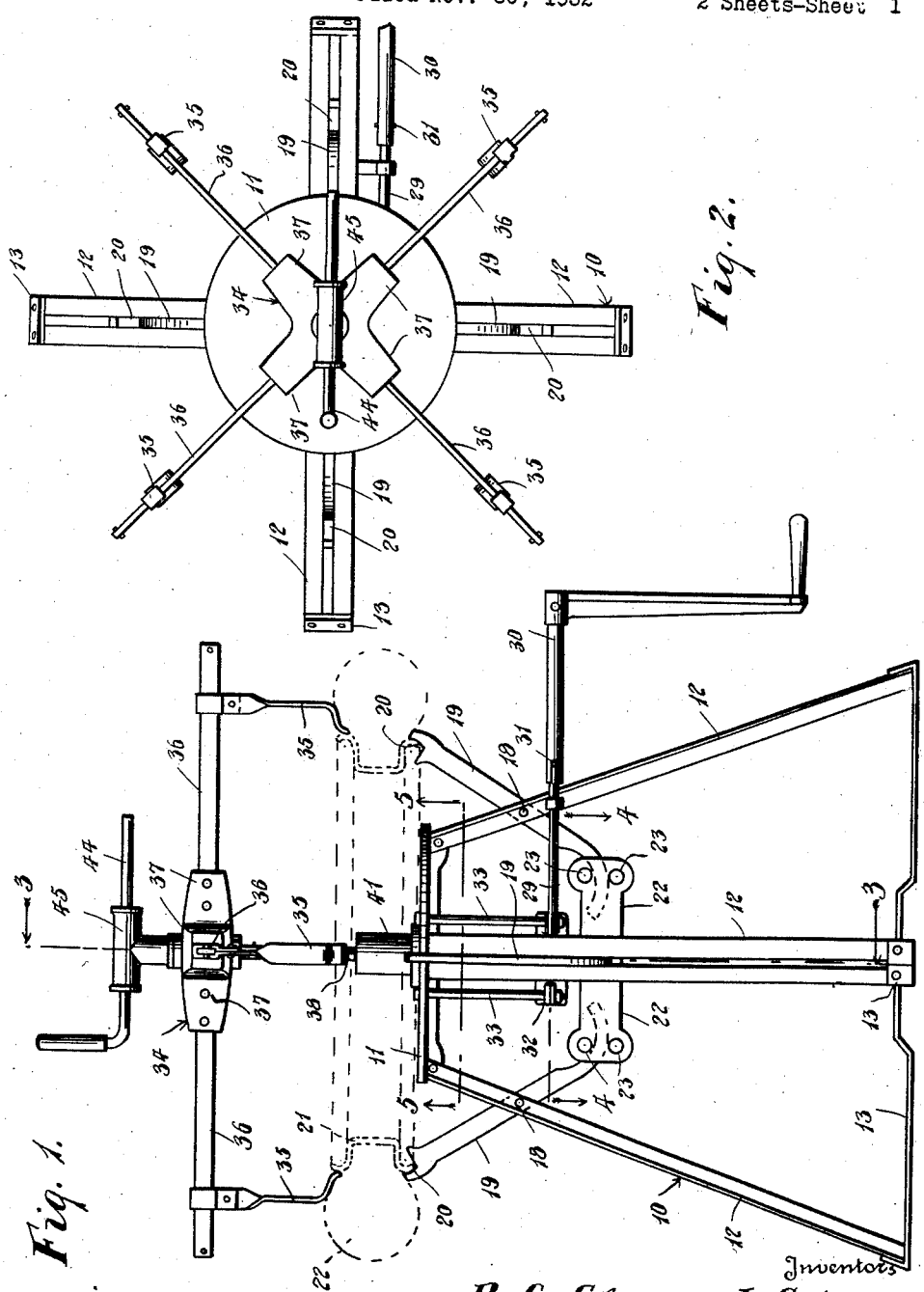

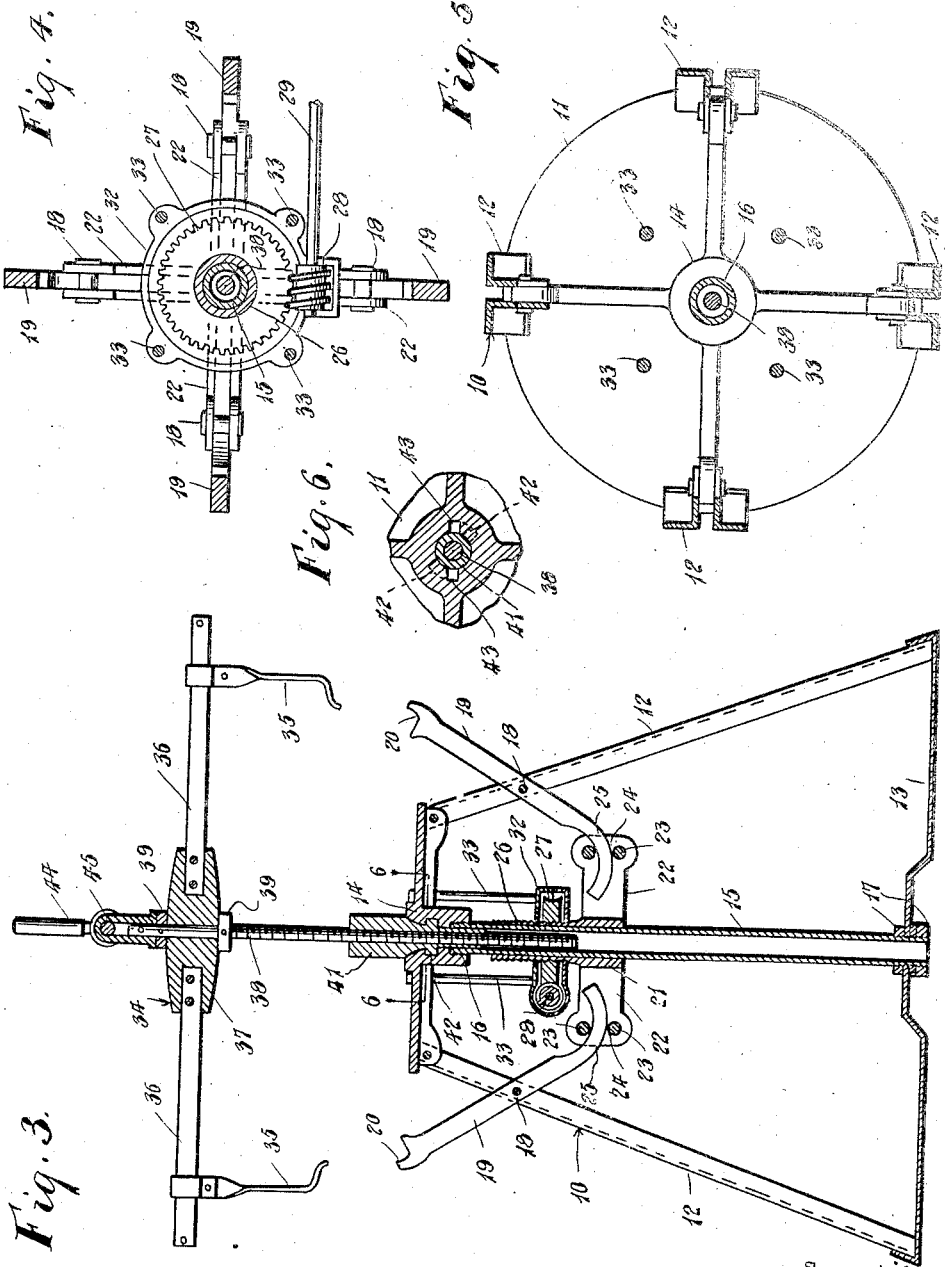

Patented Feb. 20, 1934

1,948,434

UNITED STATES PATENT OFFICE 1,948,434

AUTOMOBILE TIRE CHANGING MACHINE

Robert S. Stafford and Joseph Schrag, San Antonio, Tex.; said Schrag assignor to said Stafford Application November 30, 1932
Serial No. 645,100

3 Claims. (Cl. 157—6)

This invention relates to a machine for changing tires primarily of automobiles.

A particular object is to provide a novel machine wherein the changing of the tires may be accomplished rapidly and expeditiously and wherein the upper portion of the machine may be unitarily detached from the lower portion to accommodate the tire and rim in a novel manner and to enable ready removal thereof.

The more specific objects and advantages will become apparent from a consideration of the description following taken in connection with accompanying drawings illustrating an operative embodiment, and wherein Figure 1 is a view in side elevation of the machine, Figure 2 is a plan view, Figure 3 is a central vertical sectional view taken on the line 3—3 of Figure 1, Figure 4 is a horizontal sectional view taken on the line 4—4 of Figure 1, Figure 5 is a horizontal sectional view taken on the line 5—5 of Figure 1, and Figure 6 is a horizontal sectional view taken on the line 6—6 of Figure 3.

Referring specifically to the drawings, a suitable stand or support is provided as at 10 having a platform or table 11, downwardly and outwardly inclined legs 12 and base element 13.

Table 11 at the center has an integral hollow tube or socket member 14 to which a central tubular member 15 is screw-threaded at 16, the lower end being detachably connected to the base element 13 by means of nuts 17 screw-threaded as shown to the tube 15.

Pivotally connected as by horizontal rivets 18 and one to each leg 12, is a rim-engaging and supporting lever 19, the same being notched or cut-away at the upper end as at 20 to facilitate engagement with a rim 21 from which a tire 22 is to be removed. The rim 21 and tire 22 are to be taken as conventional automobile parts. Vertically slidable on the tube 15 by means of a sleeve 21, is a spider 22 having rod or guide members at 23 providing slots 24 receiving arcuate lower extensions 25 of the levers 19. The upper extremity of the sleeve 21 is screw-threaded at 26 and to the same, a worm wheel 27 is screw-threaded, being in mesh with an operating worm 28 carried by an operating shaft 29, which may be operated in any suitable manner, and for instance manually through the medium of a crank 30 having detachable connection with the shaft 29 by means of a pin and elongated slot as at 31. The gears 27 and 28 are suitably housed within a casing 32 rigidly suspended from the table 11 as by means of bolts or the like 33.

A pressure-applying device 34 has depending arms 35 shaped at their lower ends so as to best engage the tire 22. Arms 35 are adjustable longitudinally of spokes 36 so as to adapt the device to use on tires of different sizes. The spokes 36 are rigid with a hub 37 loosely swiveled or journaled on a rod 38 and held in place between collars 39 suitably secured thereon. The rod 38 for the major portion of its length is screw-threaded as shown and it has screw-threaded engagement in an elongated socket nut 41 which is removably applicable in the socket member 14 by means of diametrically opposite lugs 42 engaging in L-shape or bayonet slots 43 provided in the inner wall of the socket 14. As a result of this construction, the nut 41, rod 38 and all parts carried by the latter are readily removable and replaceable as a unit, to facilitate the positioning of a tire and rim and the removal thereof.

The rod 38 may be operated in any suitable manner as by means of a handle or crank 44 applied to a T-coupling 45 on the rod.

In use, the tire and rim are applied when the rod 38, nut 41 and connected parts are removed, such rim and tire thereon being supported as suggested by the dotted line in Figure 1. Thereafter, the socket 41 is applied and hence positioning the screw 38 and parts carried thereby. Elements 35 are brought into engagement with the tire 22 through manipulation of the crank or handle 44. The levers 19 are properly positioned through the operation of the crank 30, gearing 27—28, spider 32, and the levers 19.

In the case of a solid rim, the crank 44 is operated so that the arms 35 will sufficiently depress the casing 22 at one side of the rim 21 in order that the tire-fastening ring may be applied in its groove in the rim. After the ring is taken off, the pressing unit 34 is removed, and the tire and rim are reversed and the pressing unit replaced and crank 44 operated to the end that the arms 35 will completely press the tire off of the rim.

In the case of removing tires from split rims, the tire and rim are positioned in the position as shown in Figure 1 and the crank 30 thereafter operated which functions to draw the levers 19 toward each arm at the top, thereby contracting the rim.

In the case of drop center wheels, the same are mounted as suggested in Figure 1 of the drawings whereupon the casing is slipped in the groove on one side and pressed down all around by means of the hand until the casing drops in the grooves.

The removal or replacement of a casing may be accomplished by reason of the present machine rapidly and expeditiously without disfiguring, marring or scratching the casing, rim or ring.

Various changes may be resorted to provided they fall within the spirit and scope of the invention.

We claim as our invention:—

1. A tire changing machine having a frame provided with a table, rim engaging arms pivoted to the frame, a spider to actuate said arms, means to operate the spider, said spider having openings, and said arms having arcuate portions received in said openings and actuated thereby, a screw-threaded sleeve on the spider, gearing having a member threaded to said sleeve, said table having a socket, a nut detachably connected to said socket, a screw member threaded to the nut, and tire-engaging means carried by the screw member.

2. A tire changing machine having a frame provided with a table, rim engaging arms pivoted to the frame, a spider to actuate said arms, means to operate the spider, said spider having openings, and said arms having arcuate portions received in said openings and actuated thereby, a screw-threaded sleeve on the spider, gearing having a member threaded to said sleeve, said table having a socket, a nut detachably connected to said socket, a screw member threaded to the nut, and tire-engaging means carried by the screw member comprising a hub swiveled to the screw member, spokes extending therefrom having tire-engaging arms, and means to turn the screw member.

3. A tire changing machine having a frame provided with a table, rim engaging means on the frame, a spider to actuate said means, means to operate the spider, a screw-threaded sleeve on the spider, gearing having a member threaded to said sleeve, tire-engaging means having a screw telescoped in said sleeve, a nut through which the screw passes, and means detachably connecting the nut to the table and holding the latter against rotation relatively to the table.

ROBERT S. STAFFORD.
JOSEPH SCHRAG.